UNITED STATES PATENT OFFICE.

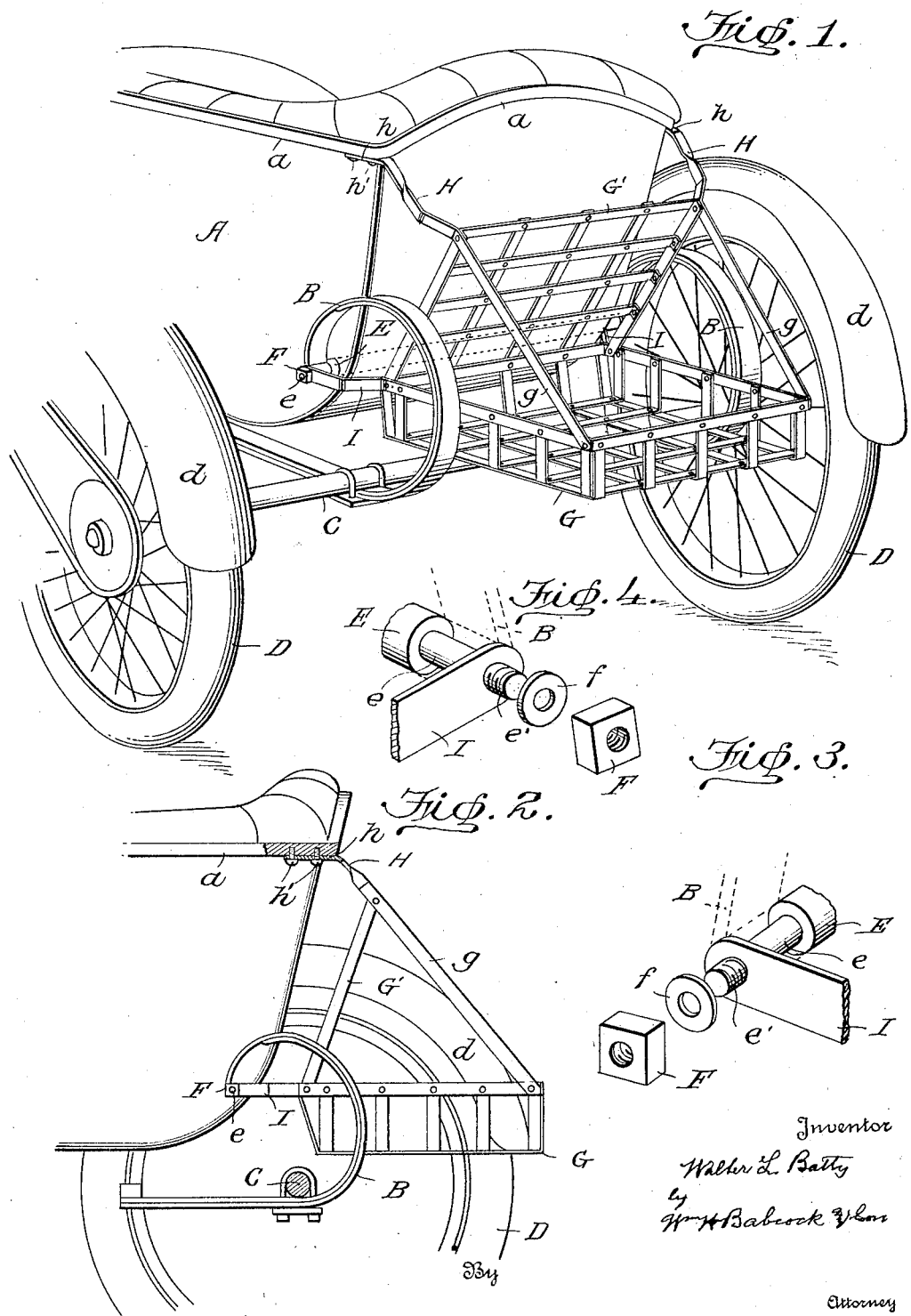

WALTER L. BATTY, OF BALTIMORE, MARYLAND.

PACKAGE AND ARTICLE CARRIER FOR MOTORCYCLE SIDE CARS.

1,385,771.   Specification of Letters Patent.   Patented July 26, 1921.

Application filed September 4, 1919. Serial No. 321,549.

*To all whom it may concern:*

Be it known that I, WALTER L. BATTY, a citizen of the United States, residing at 2122 Orleans street, Baltimore city, and State of Maryland, have invented certain new and useful Improvements in Package and Article Carriers for Motorcycle Side Cars, of which the following is a specification.

The object of this invention is to provide the side car of a two-seat motorcycle with a convenient package and article carrier, requiring no special construction of the side car and no addition of any parts thereto, but readily attached to the same and easily removed therefrom.

To this end I utilize the rod which usually supports the side-car body on its springs, merely unscrewing the nuts which hold the springs in place and applying thereto properly perforated attaching arms of the carrier, before replacing the nuts, to hold both carrier and springs in position. The upper part of the carrier is provided with similar arms which are fastened by ordinary screws to a part of the back of the side car body, preferably the bead or rim which runs along the top of this back. The carrier is by preference an open-work metal basket that does not fold but is rigid, and held on by its supporting attachments well behind the sloping back of the side car for convenience of access, its bottom being horizontal with protective side walls and a similar protective inclined half cover of open-work in front. But my broader claims on the means of holding it to the side car and facilitating its removal therefrom are applicable to many different forms of carrier and any suitable material may be used.

In the accompanying drawings, Figure 1 represents a perspective view of the rear part of a motorcycle side car, provided with a carrier in position for service, fastened thereto according to my invention;

Fig. 2 represents a side elevation of the same, slightly modified, the nearer wheel having been removed, the axle sectioned and a part of the bead or rim broken away to show the fastening screws, Fig. 3 represents in detail on an enlarged scale one of the ends of the side-car-body supporting rod with an arm of the carrier slipped thereon and the nut and washer detached, the spring being indicated by dotted lines, and Fig. 4 represents a like view of the other end and parts near it.

A designates the body of the side-car having a bead or rim $a$ along the top of its back and sides and supported as usual by two curved springs B on the axle C of transporting wheels D, the latter having mudguards $d$. The said springs, as usual, have their upper and forward ends sleeved on the protruding ends of the ordinary supporting rod E which passes through the lower part of the rear of body A, being embedded in the latter. Each end of said rod is, as usual, reduced to form a journal-like extension $e$, which is screw-threaded in its outer part at $e$ (Figs. 3 and 4) to receive a nut F for holding one of said springs in place. A washer $f$ is preferably provided between said nut and said spring.

G designates the carrier, which has a broad flat tray-like body with raised sides and an upwardly and inwardly inclined front G', serving as a guard. All of said parts of the carrier as shown are of open metallic slat work, forming a rigid basket. Brace bars $g$ extend rearward and downward from said front to the tray-like body of the carrier. Any article or package of suitable size may be conveniently deposited within this basket either from the ground or by reaching over from within the side car body, as the said carrier extends considerably behind the same and is held rigidly in place. The front guard G' will prevent such article or package from being jarred forward out of the carrier and between it and the rear of said body. It will also tend to prevent foreign matters from being flung by the wheels into the carrier or accidentally introduced at the front in any other way. It will also serve as the back of a seat for children in case they wish to ride in the carrier as often happens. Also, it provides a strong frame braced by its slats as a base for the forwardly extending arms or attachments (to be described) whereby the carrier is fastened detachably to the side car body.

From the upper corners of this front guard G' two arms H extend forward and upward, consisting of flat plates, which are twisted to present terminal horizontal parts $h$, perforated to allow the passage of small fastening screws $h'$, which take into the under side of bead or rim $a$ and hold said arms thereto, constituting the upper fastenings of the carrier. Two similar arms I, not twisted but bent outward before being extended forward, present their flat ends in a vertical plane to the ends of the rod E. Each of them is perforated to allow it to be slipped on the proximate reduced end *e* of said rod, as shown in Fig. 3.

To attach the carrier to the side car requires no change in nor addition to the latter. The nut F and washer *f* on each side are removed without disturbing the springs or any other part; the arm I on each side is slipped on the reduced end *e* of rod E the washer *f* is replaced and the nut F turned home, also the screws *h'* passing through each arm H are turned into the under side of the bead or rim *a* and the fastening is complete. A reverse procedure quickly separates the carrier from the side car.

Of course these fastenings are applicable to the attachment of almost any basket or receptacle used as a package or article carrier and the form, size and material of the arms H and I may be widely varied, it being needful only to have attachments which will slip on the ends of the body-supporting rod behind the nuts that hold the body and springs together and other attachments that may be fastened by simple screws to the bead or rim or in some equivalent way.

As shown in Fig. 1 it is best to have the rear line of the carrier extend less far rearward than the wheels D or at least than the mudguards *d*, for the protection of said carrier. The chief danger will of course be from following vehicles; and these will come first into contact with the mudguards, then with the wheels, leaving the carrier protected till the last and in most instances saved entirely from contact, which would injure its fragile construction, though perhaps not being harmful to the wheels. The same result will follow if the motorcycle should back accidentally against a wall for example. The wheels will take the shock and the carrier will be spared.

The other features of my invention may, however, be used with a carrier extending rearward farther than the wheels and mudguards as illustrated in Fig. 2. The only difference is that the carrier will be without the protection stated.

Having thus described my invention, what I claim as new and desire to secure by Letters Patent is:

1. A package and article carrier, in combination with the transverse rod of a motor cycle side car, supporting springs for said side car, and arms offset from said carrier and extending through said springs and having openings adapted to freely receive the ends of the aforesaid supporting rod.

2. A package and article carrier, in combination with the transverse supporting rod of a motor cycle side car, supporting springs for said side car, arms offset from said carrier and extending through said springs and having openings adapted to receive the ends of the aforesaid supporting rod, and brace rods connecting the rear of said carrier with said side car.

3. A package and article carrier, in combination with the transverse supporting rod of a motor cycle side car, supporting springs for said side car, arms offset from said carrier and extending through said springs and having openings adapted to freely receive the ends of the aforesaid supporting rod, brace bars connecting the rear of said carrier with said side car, and a guard carried by said brace bars and said carrier and extending rearwardly and upwardly from the forward edge of said carrier.

4. A package and article carrier, in combination with the transverse supporting rod of a motor cycle side car passing through the body of said side car and having its ends protruding beyond the sides thereof, supporting springs for said body extending at the sides of the rear thereof, arms offset from said carrier and extending laterally and then forwardly through said springs and having openings adapted to freely receive the ends of the aforesaid supporting rod, the carrier body being disposed entirely between the aforesaid springs and entirely in the rear of the aforesaid body, and means for securing said arms on said rod.

5. A package and article carrier, in combination with the transverse supporting rod of a motor cycle side car passing through the body of said side car and having its ends protruding beyond the sides thereof, supporting springs for said body extending at the sides of the rear thereof, arms offset from said carrier and extending laterally and then forwardly through said springs and having openings adapted to freely receive the ends of the aforesaid supporting rod, the carrier body being disposed entirely between the aforesaid springs and entirely in the rear of the aforesaid body, means for securing said arms on said rod, a bead extending about the aforesaid body, and arms extending from the rear of said carrier and secured to the under face of said bead.

In testimony whereof, I have signed my name to this specification in the presence of two subscribing witnesses.

WALTER L. BATTY.

Witnesses:
 EMANUEL M. BAUM,
 LILLIAN R. BAUM.